US012283766B2

(12) United States Patent
Hosoya et al.

(10) Patent No.: US 12,283,766 B2
(45) Date of Patent: Apr. 22, 2025

(54) CONNECTOR AND FLAT CABLE

(71) Applicant: Sharp Display Technology Corporation, Kameyama (JP)

(72) Inventors: Naoki Hosoya, Kameyama (JP); Chengfu Chen, Kameyama (JP); Akira Ieyama, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 311 days.

(21) Appl. No.: 17/982,410

(22) Filed: Nov. 7, 2022

(65) Prior Publication Data

US 2023/0146656 A1 May 11, 2023

Related U.S. Application Data

(60) Provisional application No. 63/276,846, filed on Nov. 8, 2021.

(51) Int. Cl.
*H01R 12/85* (2011.01)
*H01R 12/77* (2011.01)

(52) U.S. Cl.
CPC ........... *H01R 12/85* (2013.01); *H01R 12/771* (2013.01)

(58) Field of Classification Search
CPC ........ H01R 12/79; H01R 12/78; H01R 12/61; H01R 12/771; H01R 12/85
See application file for complete search history.

(56) References Cited

U.S. PATENT DOCUMENTS

| | | | | |
|---|---|---|---|---|
| 5,295,852 A * | 3/1994 | Renn | H01R 12/52 439/631 |
| 6,726,497 B2 * | 4/2004 | Nogawa | H01R 12/79 439/495 |
| 7,258,561 B2 * | 8/2007 | Fukazawa | H01R 12/88 439/495 |
| 7,909,630 B2 * | 3/2011 | Yamada | H01R 12/88 439/495 |
| 8,678,844 B2 * | 3/2014 | Yoshisuji | H01R 13/641 439/495 |
| 2005/0026494 A1 | 2/2005 | Kudo et al. | |

FOREIGN PATENT DOCUMENTS

| | | |
|---|---|---|
| JP | H07153531 A | 6/1995 |
| JP | 2005063948 A | 3/2005 |

* cited by examiner

*Primary Examiner* — Tulsidas C Patel
*Assistant Examiner* — Carlos E Lopez-Pagan
(74) *Attorney, Agent, or Firm* — ScienBiziP, P.C.

(57) ABSTRACT

In a housing of a connector, there is formed an opening to be fitted with a protruding portion formed on a flat cable in a state in which a terminal section of the flat cable is electrically connected with contactors of a contact portion in an opening space.

14 Claims, 12 Drawing Sheets

CONNECTOR AND FLAT CABLE

CROSS-REFERENCE TO RELATED APPLICATIONS

This application claims the benefit of priority to U.S. Provisional Application No. 63/276,846 filed on Nov. 8, 2021. The entire contents of the above-identified application are hereby incorporated by reference.

BACKGROUND

The disclosure relates to a connector and a flat cable to be electrically connected to the connector.

A flat cable is employed in a signal wiring line for displaying on a liquid crystal panel. Various troubles occur when connecting a flat cable to a connector. For example, since the tip of a flat cable is typically in a state with the connection terminal uncovered, when the tip of the flat cable is inserted into a connector, the connection terminal is damaged to cause display abnormality in some cases. In addition, the flat cable may be fixed while being inserted askew into the connector, so that the display abnormality may be caused. In order to prevent the problems mentioned above, the connection of the flat cable to the connector needs to be carefully carried out, and thus it takes time to connect the flat cable to the connector, which makes it difficult for the connection work to be carried out efficiently.

Then, JP 2005-063948 A and JP 07-153531 A each disclose a technique in which a flat cable is disposed in a connector from above, and then the flat cable is pulled frontward to connect and fix a connection terminal of the flat cable and a contactor of the connector to each other. According to these techniques, the flat cable is connected to the connector from a side opposite to the connection terminal, so that even when the connection terminal is uncovered at the tip thereof, breakage of the connection terminal at the tip is unlikely to occur because the insertion into the connector is not carried out from the connection terminal tip side.

SUMMARY

However, in the techniques disclosed in JP 2005-063948 A and JP 07-153531 A, the flat cable is pulled frontward to be electrically connected to the contactor of the connector. Thus, depending on a scheme of pulling the flat cable, there is a risk that the flat cable is fixed to the connector in a state in which the flat cable is set askew with respect to the connector. That is, in the techniques disclosed in JP 2005-063948 A and JP 07-153531 A, the flat cable may be fixed askew with respect to the connector, thereby raising a risk of display abnormality.

The disclosure has been contrived in view of the above-described problems, and intends to provide a connector and a flat cable that may prevent breakage of a connection terminal and also prevent a situation in which the flat cable is inserted askew into and fixed to the connector at the time of mounting the flat cable into the connector.

(1) An embodiment of the disclosure is a connector configured to electrically connect a flat cable, the connector including a housing including an opening space configured to receive the flat cable and a plurality of contactors configured to be electrically connected to connection terminals of a terminal section formed at one surface side of a first portion of the flat cable, respectively. The housing includes an upper section, a bottom section opposing the upper section, and a first side section coupling the upper section and the bottom section on one end side in a first direction. The opening space is a space surrounded by the upper section, the bottom section, and the first side section. The plurality of contactors are formed on a first inner face of the bottom section facing the opening space. The housing further includes an insertion opening on the other end side in the first direction, the insertion opening allowing a second portion of the flat cable excluding the first portion to be inserted from a side portion of the second portion into the opening space. The flat cable is allowed to move from a first position at which the second portion is located in the opening space to a second position at which the first portion is located in the opening space.

At a second inner face of the upper section facing the opening space, the connector includes a second recessed portion or a second protruding portion to be fitted with a first protruding portion or a first recessed portion provided at the other surface side of the first portion of the flat cable, in a state in which the flat cable is located at the second position and the connection terminals of the terminal section are electrically connected with the plurality of contactors, respectively.

(2) A connector of a certain embodiment of the disclosure is such that, in addition to the configuration of (1) described above, the first protruding portion or the first recessed portion is provided extending in a width direction of the flat cable, and the second protruding portion or the second recessed portion is provided extending in the first direction.

(3) A connector of a certain embodiment of the disclosure is such that, in addition to the configuration of (1) or (2) described above, the housing further includes a second side section on the other end side in the first direction, the second side section extends along a normal direction of the first inner face from the bottom section to the insertion opening, and the opening space is a space surrounded by the upper section, the bottom section, the first side section, and the second side section.

(4) A connector of a certain embodiment of the disclosure is such that, in addition to any one of the configurations of (1) to (3) described above, the second recessed portion is a through-hole passing through the upper section in a normal direction of the second inner face.

(5) A connector of a certain embodiment of the disclosure is such that, in addition to any one of the configurations of (1) to (4) described above, in the housing, a side surface on the other end side in the first direction is inclined toward the one end side in the first direction as closer to the insertion opening.

(6) A connector of a certain embodiment of the disclosure is such that, in addition to the configuration of (5) described above, the side surface on the other end side in the first direction in the housing includes a side surface on the other end side in the first direction in the upper section.

(7) A connector of a certain embodiment of the disclosure is such that, in addition to any one of the configurations of (1) to (6) described above, a side surface on one side in a second direction in the upper section is inclined toward a side surface on the other side in the second direction in the upper section as closer to the bottom section, and the second direction is a direction orthogonal to the first direction and parallel to the second inner face.

(8) A connector of a certain embodiment of the disclosure is such that, in addition to the configuration of (7) described above, in a case that the flat cable is located at the first position, the first portion of the flat cable is located on the one side in the second direction relative to the housing.

(9) A certain embodiment of the disclosure is a flat cable configured to be electrically connected to a connector, the flat cable including a first portion including an end in a longitudinal direction of the flat cable, and a terminal section constituted of a plurality of connection terminals formed at one surface side of the first portion. At the other surface side of the first portion, the flat cable includes a first protruding portion or a first recessed portion to be fitted, in a state in which the connection terminals of the terminal section are electrically connected with a plurality of contactors of the connector, respectively, with a second recessed portion or a second protruding portion provided at a second inner face of the connector, the second inner face opposing a first inner face where the contactors within the connector are formed.

(10) A flat cable of a certain embodiment of the disclosure is such that, in addition to the configuration of (9) described above, the first protruding portion or the first recessed portion is provided extending in a width direction of the flat cable, and the second protruding portion or the second recessed portion is provided extending in a first direction corresponding to the width direction of the flat cable in the above-mentioned state.

(11) A flat cable of a certain embodiment of the disclosure is such that, in addition to the configuration of (9) or (10) described above, the first protruding portion is formed on a reinforcement spacer provided at the other surface side of the first portion and configured to reinforce the flat cable.

(12) A flat cable of a certain embodiment of the disclosure is such that, in addition to the configuration of (9) or (10) described above, the first recessed portion is formed in a reinforcement spacer provided at the other surface side of the first portion and configured to reinforce the flat cable.

(13) A flat cable of a certain embodiment of the disclosure is such that, in addition to the configuration of (11) described above, a surface of the reinforcement spacer is inclined in such a manner that a thickness of the reinforcement spacer is thinner farther from the end.

(14) A flat cable of a certain embodiment of the disclosure is such that, in addition to the configuration of (12) described above, a surface of the reinforcement spacer is inclined in such a manner that a thickness of the reinforcement spacer is thinner farther from the end.

According to an aspect of the disclosure, a flat cable is not inserted from the tip thereof into a connector, and making it possible to prevent a situation in which the flat cable is inserted askew into and fixed to the connector.

BRIEF DESCRIPTION OF DRAWINGS

The disclosure will be described with reference to the accompanying drawings, wherein like numbers reference like elements.

DESCRIPTION OF EMBODIMENTS

First Embodiment

An embodiment of the disclosure will be described below. In the present embodiment, as a flat cable electrically connected to a connector, a flat cable used as a signal wiring line for displaying on a liquid crystal panel is exemplified and described, but the flat cable is not limited thereto.

Overview of Connector

Figure 1:
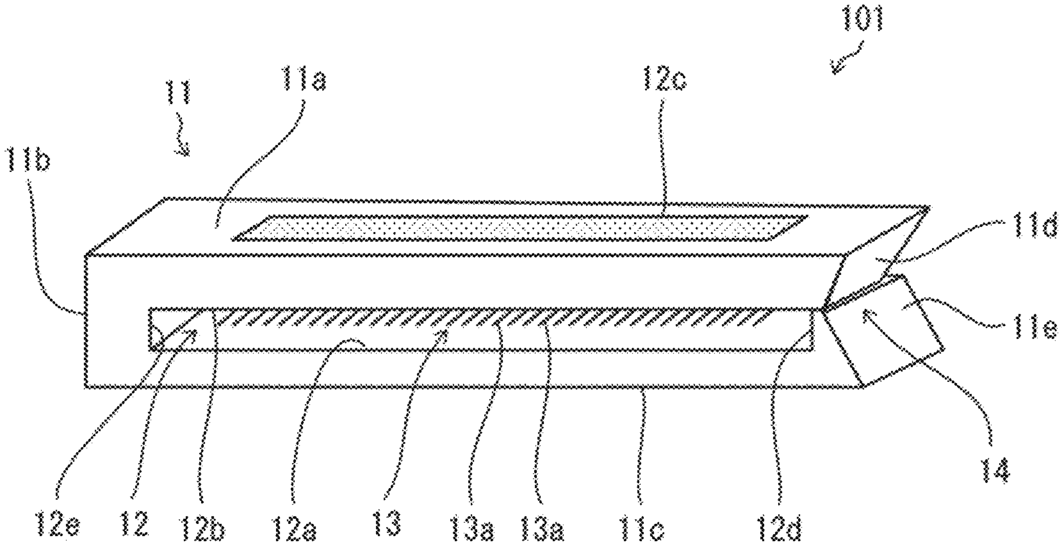
FIG. 1 is a schematic perspective view of a connector according to a first embodiment of the disclosure.

FIG. 1 is a schematic perspective view of a connector 101 according to the present embodiment. As illustrated in FIG. 1, the connector 101 includes a housing 11, an opening space 12, a contact portion 13, and an insertion portion (insertion opening) 14.

Figure 2A:
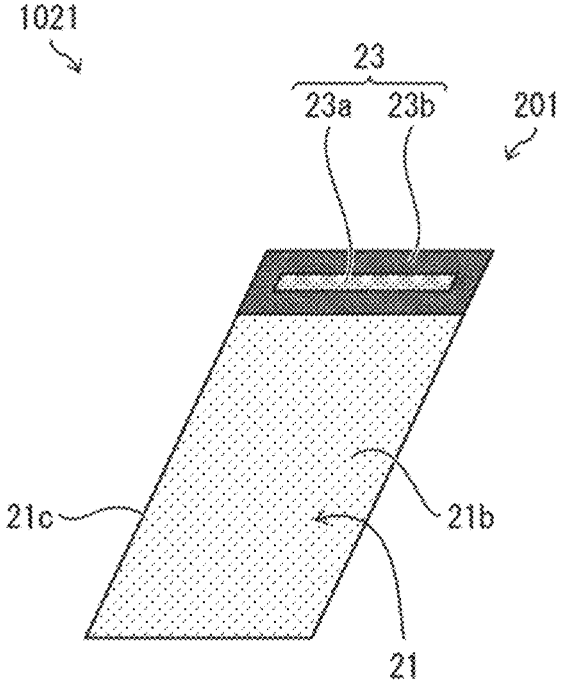
FIGS. 2A and 2B are diagrams illustrating a schematic configuration of a flat cable to be fixed to a connector.
Figure 2B:
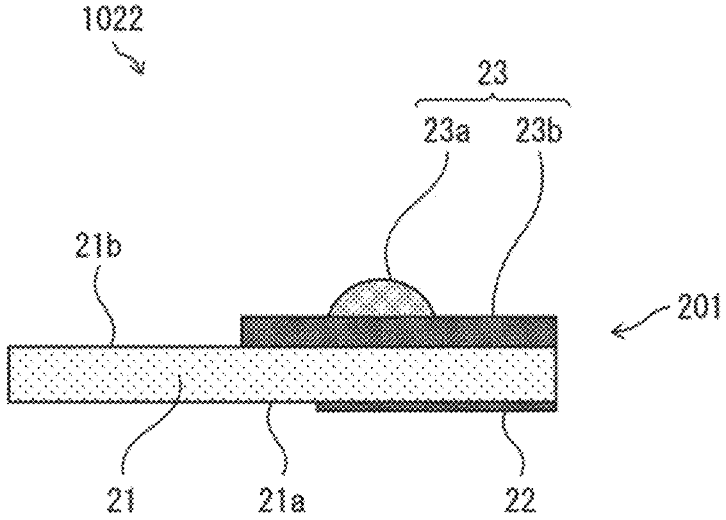

The housing 11 is a housing made of resin. The housing 11 includes an upper section including an upper face 11*a*, an inner face 12*b* (second inner face), and a first side face 11*d*; a sidewall 12*e* (first side section) including a side surface 11*b*; a bottom section including a bottom face 11*c* and an inner face 12*a* (first inner face); and a sidewall 12*d* (second side section) including a second side face 11*e*. The upper section and the bottom section oppose each other, more specifically the inner face 12*b* of the upper section facing the opening space 12 opposes the inner face 12*a* of the bottom section facing the opening space 12. The sidewall 12*e* couples the upper section and the bottom section at one end side (the left end side in FIG. 1) in a first direction (the right-left direction in FIG. 1, and a longitudinal direction of the housing 11 in the present embodiment). The sidewall 12*d* extends along the normal direction of the inner face 12*a* from the bottom section to the insertion portion 14 at the other end side (the right end side in FIG. 1) in the longitudinal direction of the housing 11. The opening space 12 is an interior space surrounded by the upper section, the sidewall 12*e*, and the bottom section of the housing 11, and is an interior space surrounded by the upper section, the sidewall 12*e*, the bottom section, and the sidewall 12*d* of the housing 11 in the present embodiment provided with the sidewall 12*d*. The opening space 12 is an opening hole passing through from a front face to a back face of the housing 11, and a width in a longitudinal direction is formed to be equal to or slightly wider than a width of a flat cable 201 (FIG. 2A and FIG. 2B). The insertion portion 14 for inserting the flat cable 201 from a side surface 21*c* of a cable main body 21 (a portion where none of a terminal section 22 and a fitting portion 23 are formed) of the flat cable 201 is provided at the other end side in the longitudinal direction of the housing 11. The flat cable 201 includes a first portion in which an end in the longitudinal direction of the flat cable 201 is included and the terminal section 22 and the fitting portion 23 are formed, and a second portion other than the first portion. That is, the insertion portion 14 allows the second portion of the flat cable 201 to be inserted from the side surface 21*c* (side section) of the second portion into the opening space 12.

The insertion portion 14 is formed between two side faces (the first side face 11*d* and the second side face 11*e*) at the other end side in the longitudinal direction of the housing 11 (between the upper section and the sidewall 12*d*). The first side face 11*d* and the second side face lie are disposed on upper and lower sides respectively, and a gap may be or may not be provided between the first side face 11*d* and the second side face lie having such a size that allows the second portion of the flat cable 201 to be inserted (for example, a gap of a size substantially equal to the thickness of the second portion of the flat cable 201). When a gap is not provided between the first side face 11*d* and the second side face 11*e*, a portion between the first side face 11*d* and the second side face lie is opened with a force of inserting the flat cable 201 into the insertion portion 14 by making use of elasticity of the housing 11. It is preferable for the first side face 11*d* and second side face lie to be formed inclining toward the interior of the opening space 12, in other words, formed inclining toward the one end side in the longitudinal direction of the housing 11 as closer to the insertion portion 14. This makes it easy to insert the flat cable 201 into the insertion portion 14.

The contact portion 13 constituted of a plurality of contactors 13*a* is formed on the inner face 12*a* of the housing 11. An opening 12*c* (second recessed portion) passing through the upper section of the housing 11 from the inner face 12*b* to the upper face 11*a* is formed in the inner face 12*b*, which is a face opposing the inner face 12*a*. The opening 12*c* is provided extending in the longitudinal direction of the housing 11. The size of the opening 12*c* is not particularly limited, and it is sufficient for the opening 12*c* to have such a size that allows a protruding portion 23*a* (first protruding portion) (FIG. 2A and FIG. 2B), which constitutes the fitting portion 23 formed in the first portion of the flat cable 201, to be appropriately fitted. Details of the fitting of the protruding portion 23*a* into the opening 12*c* will be described later. In this case, a situation in which the fitting can be appropriately carried out refers to a state in which the protruding portion 23*a* of the flat cable 201 is completely fitted into the opening 12*c* of the housing 11 while the contact portion 13 and the terminal section 22 of the flat cable 201 are electrically connected to each other appropriately.

The sidewall 12*d* perpendicular to the inner face 12*a* is formed on the insertion portion 14 side of the opening space 12. By providing the sidewall 12*d*, it makes it possible to prevent the flat cable 201 set in the opening space 12 from being easily detached from the insertion portion 14. Since the sidewall 12*d* and the sidewall 12*e* opposing thereto in the opening space 12 are perpendicular to the inner face 12*a*, the inserted flat cable 201 may be corrected to be perpendicular to the connector 101.

Overview of Flat Cable

FIG. 2A indicates a schematic perspective view of the flat cable 201 to be electrically connected to the connector 101 illustrated in FIG. 1, and FIG. 2B indicates a side view of the flat cable 201 when viewed from a short-hand direction.

In the flat cable 201, the terminal section 22 and the fitting portion 23 are formed in the first portion including the end in the longitudinal direction of the cable main body 21. When, of both end portions in the longitudinal direction of the cable main body 21, the end portion side where the terminal section 22 and the fitting portion 23 are formed is defined as an upstream side, and the opposite end portion side is defined as a downstream side, the side surface 21*c* of the cable main body 21 (in other words, the side surface 21*c* in the second portion of the flat cable 201) to be inserted into the insertion portion 14 formed in the housing 11 of the connector 101 is located on the downstream side when viewed from the side where the terminal section 22 and the fitting portion 23 of the cable main body 21 are formed. Depending on the shape and size of the insertion portion 14 of the housing 11, part of or all of the terminal section 22 and the fitting portion 23 formed in the cable main body 21 may be inserted from the width direction of the cable main body 21 through the insertion portion 14. In this case, the insertion portion 14 of the housing 11 needs to have such a shape and a size that allow part of or all of the terminal section 22 and the fitting portion 23 formed in the cable main body 21 to be inserted.

The terminal section 22 is constituted of a plurality of connection terminals (not illustrated), and is formed on a first surface 21*a* in the first portion of the flat cable 201. Each connection terminal of the terminal section 22 is electrically connected to each of the contactors 13*a* of the contact portion 13 in the connector 101 in a state in which the flat cable 201 is mounted in the connector 101.

The fitting portion 23 is formed on a second surface 21*b* (a surface on the opposite side to the first surface 21*a*) in the first portion of the flat cable 201, and is constituted of a reinforcement spacer 23*b* configured to reinforce the cable main body 21 and the protruding portion 23*a* formed on the reinforcement spacer 23*b*.

The reinforcement spacer 23*b* is formed of a resin sheet having a predetermined thickness and having a flat plate shape fully extended in the width direction of the cable main body 21. The reinforcement spacer 23*b* may have or may not have elasticity.

The protruding portion 23*a* is a resin molding member having a semicircular columnar shape extended in the width direction of the cable main body 21 on the reinforcement spacer 23*b*. The protruding portion 23*a* is formed in a size that fits into the opening 12*c* of the connector 101. The protruding portion 23*a* is formed at a position opposing the terminal section 22 formed on the first surface 21*a*, which is an opposite surface of the cable main body 21. The protruding portion 23*a* may be a different member from the reinforcement spacer 23*b* as described above, or may be integrally formed therewith.

Details of Opening 12*c* of Connector 101

Figure 3:
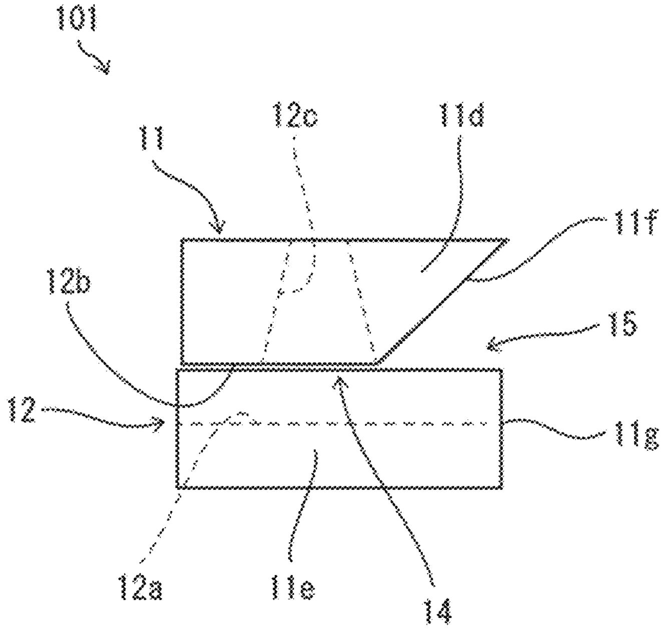
FIG. 3 is a side view of a connector.

FIG. 3 illustrates a side view seen from the insertion portion 14 side of the connector 101 illustrated in FIG. 1. As illustrated in FIG. 3, the opening 12*c* of the connector 101 is formed in a substantially trapezoidal shape in cross section being wide at the inner face 12*b* side of the upper section and becoming narrower toward the upper face 11*a* side of the upper section in the housing 11. The opening 12*c* passes through from the inner face 12*b* of the upper section to the upper face 11*a* in the housing 11, and therefore the protruding portion 23*a* of the flat cable 201 fitted into the opening 12*c* may be confirmed from the upper face 11*a* side of the connector 101. In other words, the attachment of the flat cable 201 to the connector 101 can be confirmed from the opening 12*c*.

The opening 12*c* is formed to oppose the contact portion 13 formed on the inner face 12*a* of the bottom section in the housing 11. Thus, in a state in which the flat cable 201 is mounted in the connector 101, when the protruding portion 23*a* of the flat cable 201 fits into the opening 12*c*, the terminal section 22 opposing the protruding portion 23*a* is in contact with the contact portion 13.

A cable receiver 15 for receiving the flat cable 201 inserted from the insertion portion 14 is formed on a back face side of the connector 101. The back face side of the connector 101 refers to one side in a second direction orthogonal to the first direction (the longitudinal direction of the housing 11) and parallel to the inner face 12*b*, and is the right side in FIG. 3. The cable receiver 15 is constituted of an inclined surface **11*f* provided on the back face side of the connector 101, and an opening 11*g*. The inclined surface 11*f* is a side surface on the side receiving the fitting portion 23 of the flat cable 201 from the short-hand direction of the opening space 12 of the housing 11, and is inclined toward the opening space 12 side. That is, the side surface on the one side (the right side in FIG. 3) in the second direction of the upper section in the housing 11 is inclined toward a side surface on the other side (the left side in FIG. 3) in the second direction of the upper section as closer to the bottom section. The opening 11*g* is an opening that communicates with the opening space 12**.

When the flat cable 201 inserted from the insertion portion 14 of the connector 101 is pulled toward the opposite side to the cable receiver 15 (toward the other side in the second direction), the terminal section 22 and the fitting portion 23 are inserted from the cable receiver 15 into the opening space 12 of the connector 101. Since the inclined surface **11*f* constituting the cable receiver 15 is inclined toward the opening space 12 side, the fitting portion 23 of the cable main body 21 is easily inserted into the opening space 12 by making use of the inclined surface 11*f***.

Mounting of Flat Cable 201 into Connector 101

Figure 4:
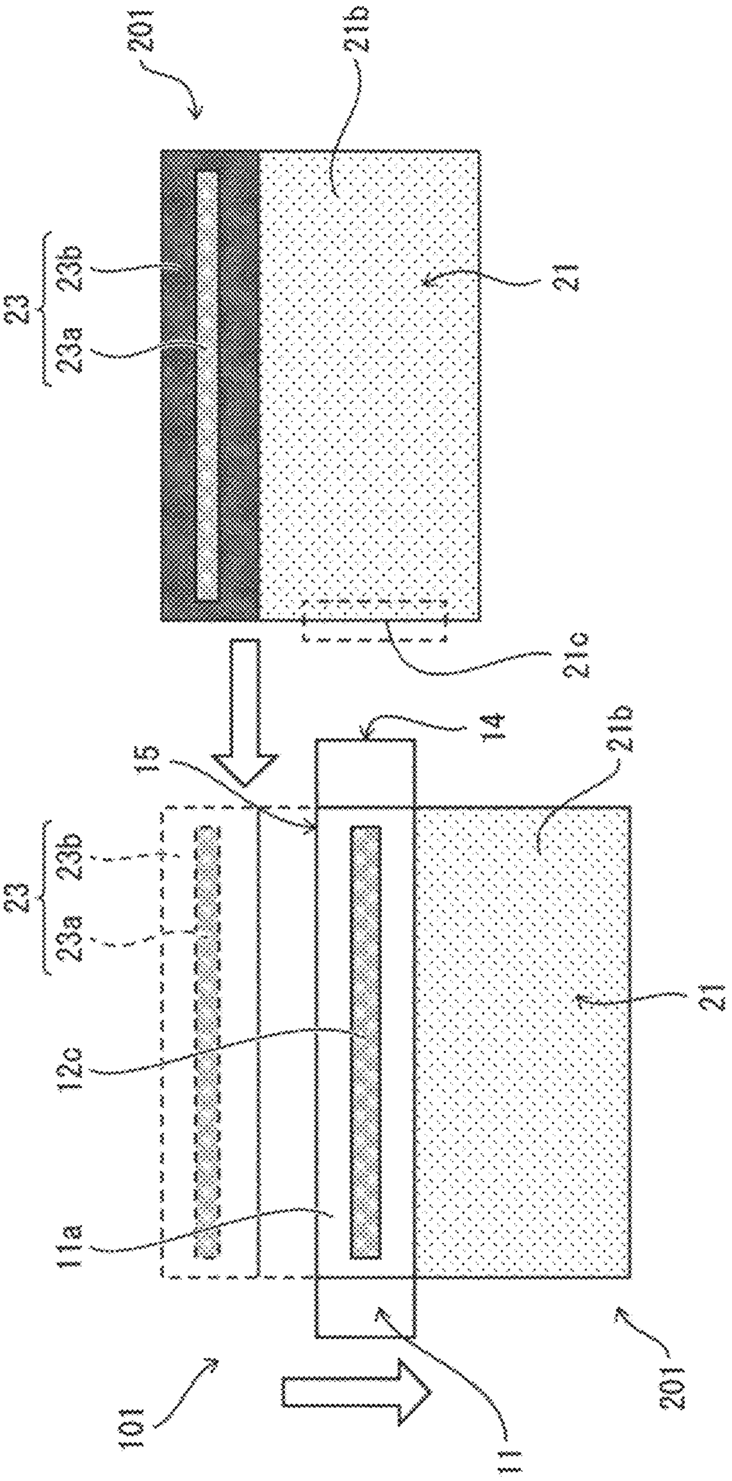
FIG. 4 is a diagram describing a method for connecting a flat cable.
Figure 5:
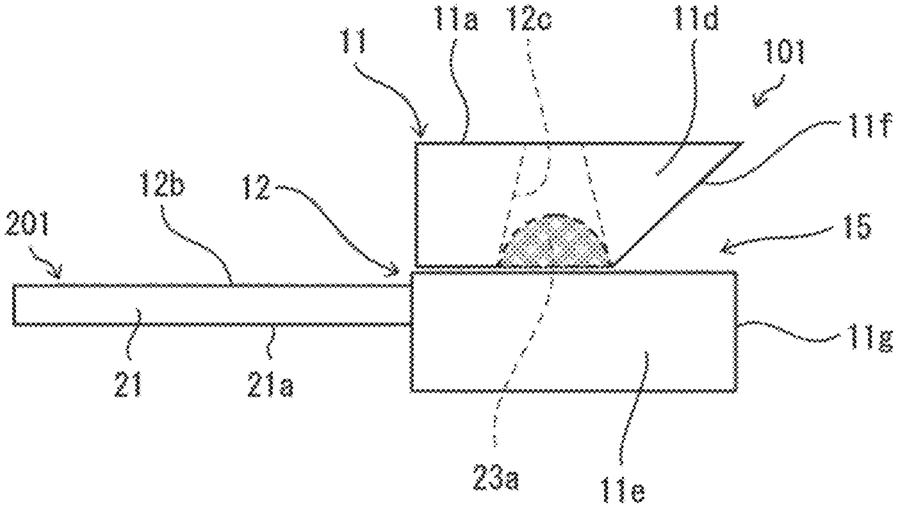
FIG. 5 is a diagram illustrating a connection structure of a flat cable.

FIG. 4 illustrates an explanatory diagram for describing a method for mounting the flat cable 201 into the connector 101. FIG. 5 illustrates a diagram viewed from the side surface of the connector 101 when the mounting of the flat cable 201 into the connector 101 is completed.

As illustrated in FIG. 4, the second portion of the flat cable 201 is inserted first into the opening space 12 from the side surface **21*c* of the second portion through the insertion portion 14 of the connector 101. The flat cable 201, the second portion of which is inserted into the opening space 12, can move toward the other side in the second direction (the lower side in FIG. 4) until the first portion in which the terminal section 22 and the fitting portion 23 are formed is located inside the opening space 12. In other words, the connector 101 is configured in such a manner that the flat cable 201 can move from a first position at which the second portion of the flat cable 201 is located in the opening space 12 to a second position at which the first portion of the flat cable 201 is located in the opening space 12. When the flat cable 201 is located at the first position, the first portion of the flat cable 201 is located on the one side in the second direction (the upper side in FIG. 4) relative to the housing 11. After the insertion of the second portion of the flat cable 201 is completed, the flat cable 201 is pulled toward the opposite side to the side where the fitting portion 23 is formed (toward the other side in the second direction), so as to move the first portion to the opening space 12, thereby fitting the protruding portion 23*a* of the fitting portion 23 of the flat cable 201 into the opening 12*c* of the connector 101, as illustrated in FIG. 5. With this, the mounting of the flat cable 201 into the connector 101** is completed.

In this case, when pulling the flat cable 201, whether the protruding portion **23*a* of the fitting portion 23 of the flat cable 201 is properly fitted can be easily determined by visually observing the opening 12*c* of the connector 101 from above. In other words, it makes it possible to easily determine whether the flat cable 201 is set at a predetermined position in the connector 101, that is, whether the terminal section 22 of the flat cable 201 is set at the position properly connected with the contact portion 13 in the connector 101. This makes it possible to prevent the terminal section 22 from being inserted askew into the connector 101**.

Since the reinforcement spacer **23*b* constituting the fitting portion 23 is a sheet having a flat plate shape with a predetermined thickness, the reinforcement spacer 23*b* has a function of a shaft-like role to maintain the terminal section 22 to be level, and also has a function of pressure-bonding the terminal section 22 of the flat cable 201 to the contact portion 13 of the connector 101 when the protruding portion 23*a* is fitted into the opening 12*c***.

Advantageous Effects

By using the connector 101 and the flat cable 201 each having the configuration described above, the protruding portion **23*a* provided on the second surface 21*b* as a surface on the opposite side to the first surface 21*a* as a forming surface where the terminal section 22 of the flat cable 201 is formed, is fitted into the opening 12*c*, which is a recessed portion provided in the inner face 12*b* opposing the inner face 12*a* as a forming surface where the plurality of contactors 13*a* of the housing 11 are formed, whereby each of the connection terminals of the terminal section 22 of the flat cable 201 is made to be electrically connected with the plurality of contactors 13*a* of the housing 11. At this time, the side surface 21*c* in the second portion of the flat cable 201 on the downstream side relative to the terminal section 22 is inserted through the insertion portion 14 formed at the end portion in the longitudinal direction of the opening space 12 of the housing 11, and thereafter the flat cable 201 is pulled toward the opposite side to the terminal section 22, whereby the terminal section 22 of the flat cable 201 is guided to the opening space 12 of the housing 11. Then, the protruding portion 23*a* on the flat cable 201 side is fitted into the opening 12*c*, which is a recessed portion on the housing 11 side, and thus, the flat cable 201 is fixed at an appropriate position, and the terminal section 22 and the plurality of contactors 13*a*** are electrically connected.

As discussed above, when the flat cable 201 is mounted in the connector 101, the flat cable 201 is not connected to the contactors **13*a* of the connector 101 from the tip thereof, thereby making it possible to prevent the breakage of the connection terminals at the tip of the flat cable 201 when mounted in the connector 101. Moreover, because it makes it possible to visually confirm, from the opening 12*c*, that the protruding portion 23*a* provided on the flat cable 201 is fitted into the opening 12*c*, which is a recessed portion provided on the connector 101 side, it may be easily confirmed that the flat cable 201 is mounted at an appropriate position with respect to the connector 101. Accordingly, the flat cable 201 can be prevented from being inserted askew with respect to the connector 101**. As described above, the breakage of the connection terminals at the tip of the flat cable and the case of the flat cable being inserted askew that have been considered to be troublesome issues in the prior art, may be prevented at the same time.

Second Embodiment

Another embodiment of the disclosure will be described below. In the present embodiment, members having the same functions as the members in the first embodiment are denoted by the same reference signs, and detailed description thereof is omitted. In the second embodiment, points different from the first embodiment will mainly be described.

Overview of Connector

Figure 6:
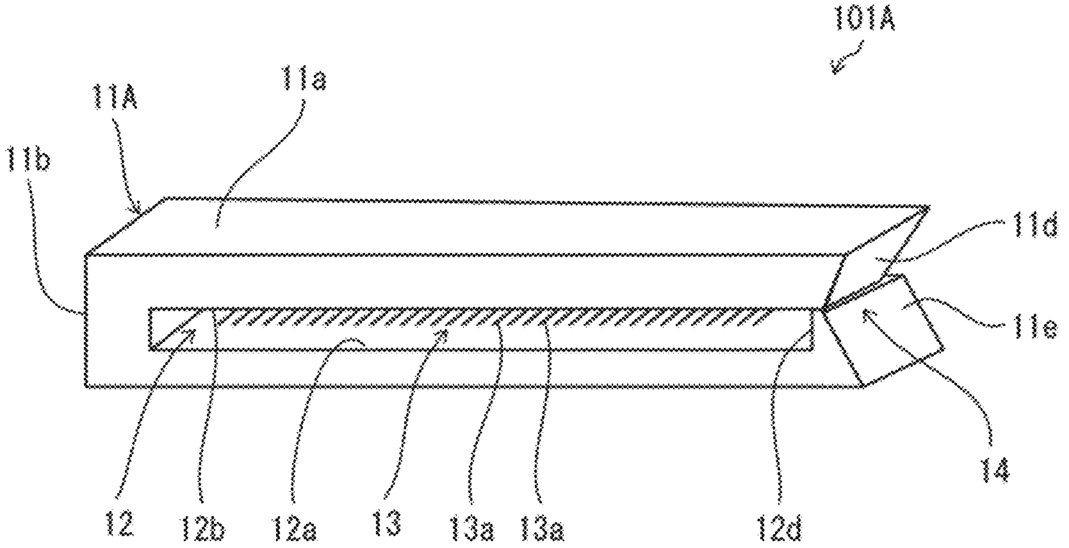
FIG. 6 is a schematic perspective view of a connector according to a second embodiment of the disclosure.
Figure 7:
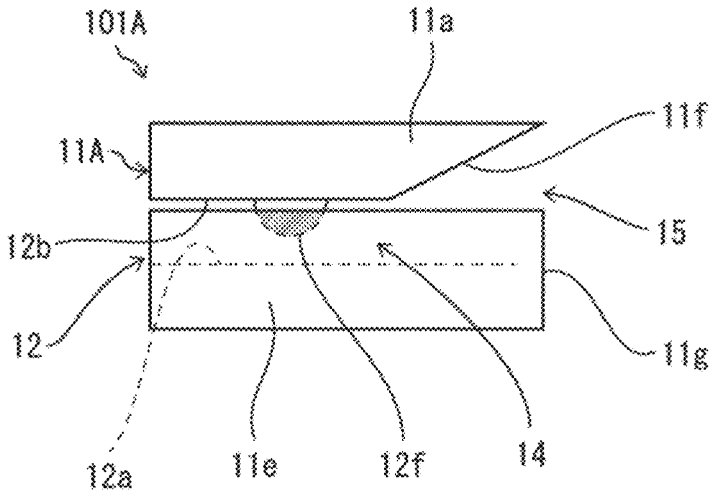
FIG. 7 is a side view of a connector.

FIG. 6 illustrates a schematic perspective view of a connector 101A according to the present embodiment. FIG. 7 illustrates a side view seen from the side of an insertion portion 14 of the connector 101A illustrated in FIG. 6. As illustrated in FIG. 6, the connector 101A includes a housing 11A, an opening space 12, a contact portion 13, and the insertion portion 14.

The contact portion 13 constituted of a plurality of contactors 13*a* is formed on an inner face 12*a* of the housing 11A. A protruding portion 12*f* (second protruding portion) protruding toward the inner face 12*a* is formed on an inner face 12*b*, which is a face opposing the inner face 12*a*. The protruding portion 12*f* is a resin molding member having a semicircular columnar shape extended in the longitudinal direction of the housing 11A. The size of the protruding portion 12*f* is not particularly limited, and it is sufficient for the protruding portion 12*f* to have such a size that allows the protruding portion 12*f* to be appropriately fitted into a recessed portion 24*a* (first recessed portion) (FIG. 8) constituting a fitting portion 24 formed in a first portion of the flat cable 201A. Details of the fitting of the recessed portion 24*a* onto the protruding portion 12*f* will be described later.

The protruding portion 12*f* is formed to oppose the contact portion 13 formed on the inner face 12*a*. Thus, in a state in which the flat cable 201A is mounted in the connector 101A, when the recessed portion 24*a* of the flat cable 201A is fitted onto the protruding portion 12*f*, a terminal section 22 opposing the recessed portion 24*a* is in contact with the contact portion 13.

Overview of Flat Cable

Figure 8:
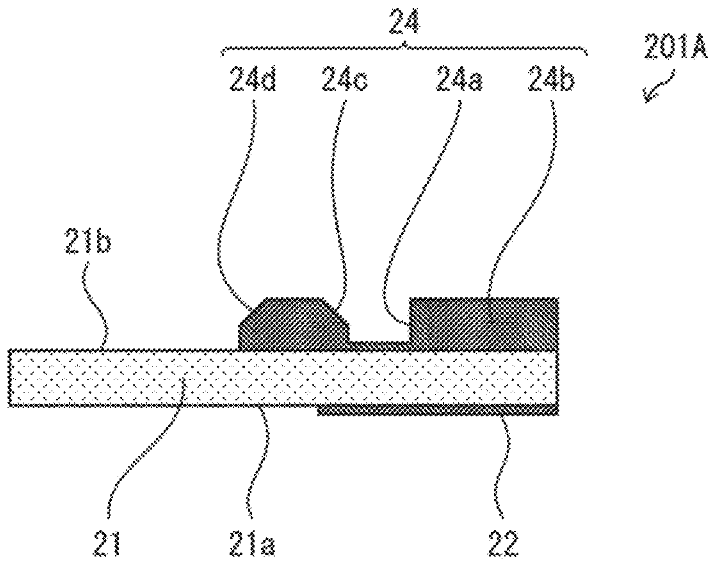
FIG. 8 is a side view of a flat cable.

FIG. 8 illustrates a side view seen from a short-hand direction of the flat cable 201A. In the flat cable 201A, the terminal section 22 and the fitting portion 24 are formed at one end side (first portion) of a cable main body 21. The terminal section 22 is constituted of a plurality of connection terminals (not illustrated), and is formed on a first surface 21*a* of the cable main body 21. Each connection terminal of the terminal section 22 is electrically connected to each of the contactors 13*a* of the contact portion 13 in the connector 101A in a state in which the flat cable 201A is mounted in the connector 101A.

The fitting portion 24 is constituted of a reinforcement spacer 24*b* formed on a second surface 21*b* on the opposite side to the first surface 21*a* of the side where the terminal section 22 is formed, and the recessed portion 24*a* recessed on the reinforcement spacer 24*b*. In other words, the recessed portion 24*a* is formed in the reinforcement spacer 24*b*. The reinforcement spacer 24*b* includes, across the recessed portion 24*a*, a first inclined surface 24*c*, where the downstream side of the flat cable 201A inclines downward toward the recessed portion 24*a* side, and a second inclined surface 24*d* arranged on the opposite side to the first inclined surface 24*c* and inclined downward toward the cable main body 21 side. The protruding portion 12*f* of the connector 101A is easily fitted into the recessed portion 24*a* by the first inclined surface 24*c*. When the terminal section 22 of the cable main body 21 is mounted in the connector 101A, the second inclined surface 24*d* facilitates the insertion into the inclined surface 11*f* of the cable receiver 15 of the housing 11A.

Mounting of Flat Cable 201A into Connector 101A

Figure 9:
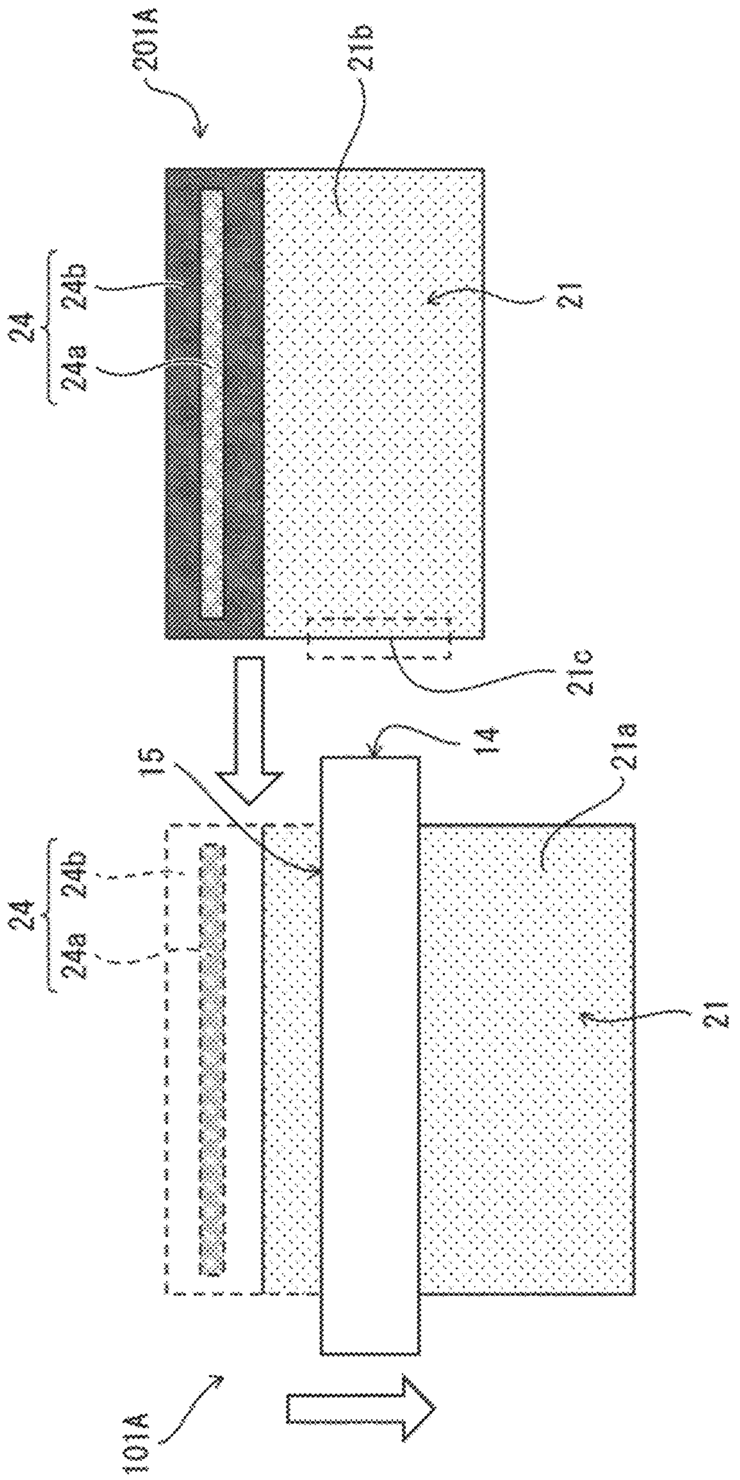
FIG. 9 is a diagram describing a method for connecting a flat cable.
Figure 10:
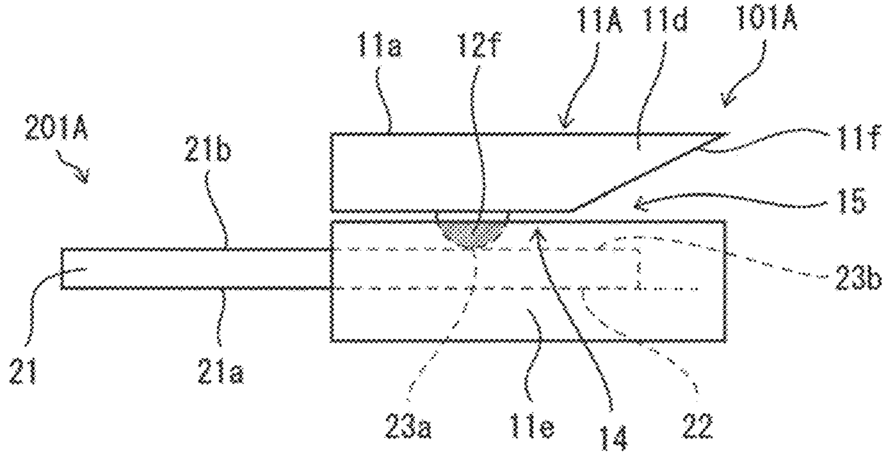
FIG. 10 is a diagram illustrating a connection structure of a flat cable.

FIG. 9 illustrates an explanatory diagram for describing a method for mounting the flat cable 201A into the connector 101A. FIG. 10 illustrates a diagram viewed from the side surface of the connector 101A when the mounting of the flat cable 201A into the connector 101A is completed.

As illustrated in FIG. 9, a second portion of the flat cable 201A is inserted first into the opening space 12 through the insertion portion 14 of the connector 101A from a side surface 21*c* of the second portion. After the insertion of the second portion of the flat cable 201A is completed, the flat cable 201A is pulled toward the opposite side to the side where the fitting portion 24 is formed (toward the other side in the second direction) so as to move the first portion to the opening space 12, thereby fitting the recessed portion 24*a* of the fitting portion 24 of the flat cable 201A onto the protruding portion 12*f* of the connector 101A, as illustrated in FIG. 10. With this, the mounting of the flat cable 201A into the connector 101A is completed.

Advantageous Effects

The connector 101A and the flat cable 201A each having the configuration described above exhibit the same effects as those exhibited by the connector 101 and the flat cable 201 of the first embodiment.

Since the reinforcement spacer 24*b* constituting the fitting portion 24 is a sheet having a flat plate shape with a predetermined thickness, the reinforcement spacer 24*b* has a function of a shaft-like role to maintain the terminal section 22 to be level, and also has a function of pressure-bonding the terminal section 22 of the flat cable 201A to the contact portion 13 of the connector 101A when the recessed portion 24*a* is fitted onto the protruding portion 12*f*.

In the first and second embodiments, after inserting the flat cable from the insertion portion formed at the end portion in the longitudinal direction of the connector, the opposite side to the terminal section forming side of the flat cable is pulled in the short-hand direction of the connector so as to fit the fitting portion of the flat cable into the recessed portion or onto the protruding portion of the connector, thereby completing the mounting of the flat cable into the connector. However, the disclosure is not limited thereto; the flat cable may be inserted from the cable receiver of the connector, not from the insertion portion of the connector, and then the mounting of the flat cable into the connector may be completed. An example of the above case will be described below in a third embodiment.

Third Embodiment

Another embodiment of the disclosure will be described below. In the present embodiment, members having the same functions as the members in the first and second embodiments are denoted by the same reference signs, and detailed description thereof is omitted.

Overview of Connector

Figure 11:
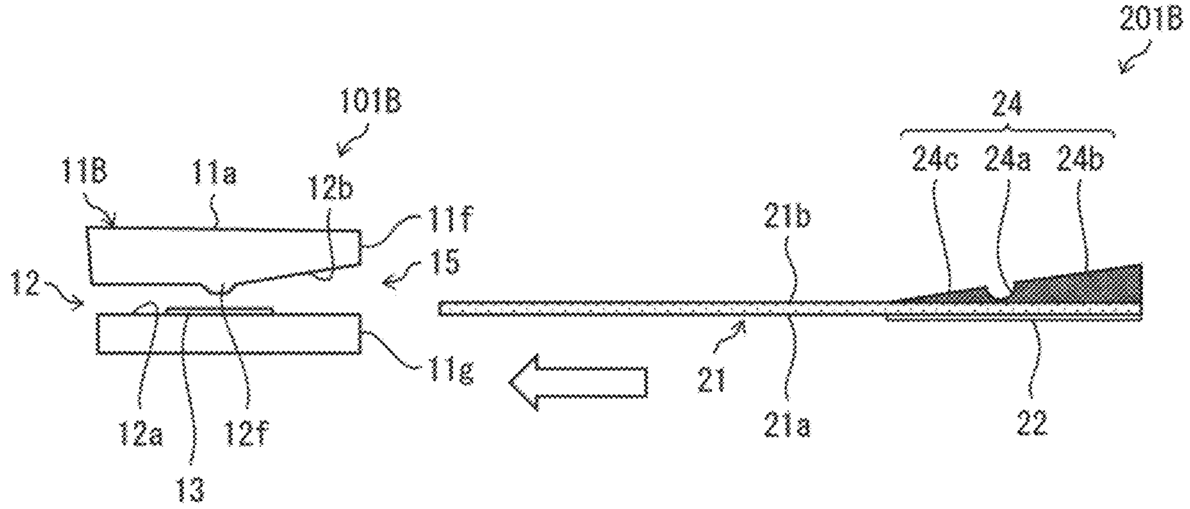
FIG. 11 is a side view of a connector and a flat cable according to a third embodiment of the disclosure.
Figure 12:
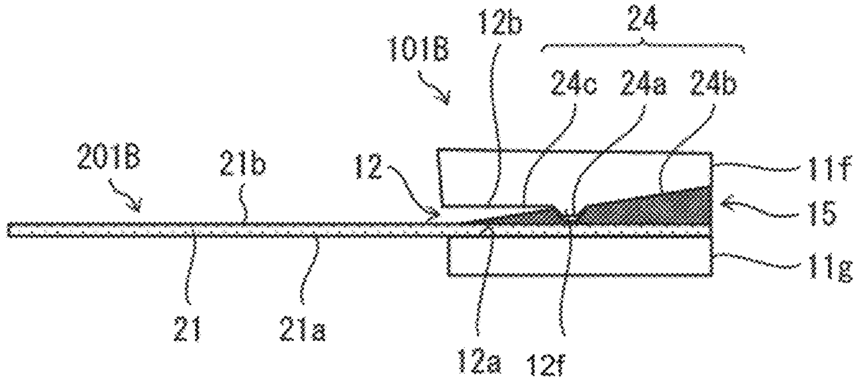
FIG. 12 is a diagram illustrating a connection structure of a flat cable.

FIG. 11 illustrates a side view of a state in which a flat cable 201B is mounted from a side of a cable receiver 15 of a connector 101B. FIG. 12 illustrates a side view of a state in which the mounting of the flat cable 201B into the connector 101B is completed.

As illustrated in FIG. 11, the connector 101B includes a housing 11B, an opening space 12, a contact portion 13, and the cable receiver 15. The connector 101B has substantially the same configuration as the connector 101A of the second embodiment. The connector 101B may include or may not include the insertion portion 14 included in the connector 101A. In a case where the insertion portion 14 is provided, the insertion may be carried out from a side surface (a side surface of a portion where none of a terminal section 22 and a fitting portion 24 are formed) of a second portion of the flat cable 201B into the insertion portion 14, or part of or all of the terminal section 22 and the fitting portion 24 formed in a cable main body 21 may be inserted from the insertion portion 14 depending on the shape and size of the insertion portion 14.

In the connector 101B, an inner face 12*b* of the upper section of the housing 11 is inclined upward in a direction toward the cable receiver 15. This makes an opening of the cable receiver 15 large, and facilitates the insertion from the end portion on the opposite side to the portion where the terminal section 22 and the fitting portion 24 are formed in the flat cable 201B.

The flat cable 201B has substantially the same configuration as the flat cable 201A of the second embodiment, but differs in that a reinforcement spacer 24*b* of the fitting portion 24 is inclined. In the present embodiment, the surface of the reinforcement spacer 24*b* is inclined so that the thickness of the reinforcement spacer 24*b* is thinner farther from an end of the side where the fitting portion 24 is formed in the longitudinal direction of the flat cable 201B. This makes it possible to easily guide the fitting portion 24 to an appropriate position (a position at which a protruding portion 12*f* is formed) in the connector 101B even when the insertion is carried out from the end portion on the opposite side to the forming portion of the terminal section 22 and the fitting portion 24 in the flat cable 201B. Note that a protruding portion may be provided on the reinforcement spacer 24*b* with the surface inclined, and a recessed portion may be provided on the inner face 12*b* of the connector 101B.

The reinforcement spacer 24*b* is set to be sized for being housed inside the opening space 12 in a state in which the flat cable 201B is mounted in the connector 101B, as illustrated in FIG. 12. By causing the thickness of the reinforcement spacer 24*b* to be slightly larger than that of the opening space 12, the terminal section 22 may be pressure-bonded toward the contact portion 13 in a state in which the mounting of the flat cable 201B into the connector 101B is completed.

Advantageous Effects

The connector 101B and the flat cable 201B each having the configuration described above exhibit the same effects as those exhibited by the connector 101A and the flat cable 201A of the second embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A connector configured to electrically connect a flat cable, the connector comprising:

a housing including an opening space configured to receive the flat cable; and a plurality of contactors configured to be electrically connected to connection terminals of a terminal section formed at one surface side of a first portion of the flat cable, respectively, wherein the housing includes an upper section, a bottom section opposing the upper section, and a first side section coupling the upper section and the bottom section on one end side in a first direction, the opening space is a space surrounded by the upper section, the bottom section, and the first side section, the plurality of contactors are formed on a first inner face of the bottom section facing the opening space, the housing further includes an insertion opening on the other end side in the first direction, the insertion opening allowing a second portion of the flat cable excluding the first portion to be inserted from a side portion of the second portion into the opening space, the flat cable is allowed to move from a first position at which the second portion is located in the opening space to a second position at which the first portion is located in the opening space, and at a second inner face of the upper section facing the opening space, the connector includes a second recessed portion or a second protruding portion to be fitted with a first protruding portion or a first recessed portion provided at the other surface side of the first portion of the flat cable, in a state in which the flat cable is located at the second position and the connection terminals of the terminal section are electrically connected with the plurality of contactors, respectively.

2. The connector according to claim 1, wherein the first protruding portion or the first recessed portion is provided extending in a width direction of the flat cable, and the second protruding portion or the second recessed portion is provided extending in the first direction.

3. The connector according to claim 1, wherein the housing further includes a second side section on the other end side in the first direction, the second side section extends along a normal direction of the first inner face from the bottom section to the insertion opening, and the opening space is a space surrounded by the upper section, the bottom section, the first side section, and the second side section.

4. The connector according to claim 1, wherein the second recessed portion is a through-hole passing through the upper section in a normal direction of the second inner face.

5. The connector according to claim 1, wherein, in the housing, a side surface on the other end side in the first direction is inclined toward the one end side in the first direction as closer to the insertion opening.

6. The connector according to claim 1, wherein a side surface on one side in a second direction in the upper section is inclined toward a side surface on the other side in the second direction in the upper section as closer to the bottom section, and the second direction is a direction orthogonal to the first direction and parallel to the second inner face.

7. The connector according to claim 5, wherein the side surface on the other end side in the first direction in the housing includes a side surface on the other end side in the first direction in the upper section.

8. The connector according to claim 6, wherein in a case that the flat cable is located at the first position, the first portion of the flat cable is located on the one side in the second direction relative to the housing.

9. A flat cable configured to be electrically connected to a connector, the flat cable comprising:

a first portion including an end in a longitudinal direction of the flat cable; and a terminal section constituted of a plurality of connection terminals formed at one surface side of the first portion, wherein at the other surface side of the first portion, the flat cable includes a first protruding portion or a first recessed portion to be fitted, in a state in which the connection terminals of the terminal section are electrically connected with a plurality of contactors of the connector, respectively, with a second recessed portion or a second protruding portion provided at a second inner face of the connector, the second inner face opposing a first inner face where the contactors within the connector are formed.

10. The flat cable according to claim 9, wherein the first protruding portion or the first recessed portion is provided extending in a width direction of the flat cable, and the second protruding portion or the second recessed portion is provided extending in a first direction corresponding to the width direction of the flat cable in the above-mentioned state.

11. The flat cable according to claim 9, wherein the first protruding portion is formed on a reinforcement spacer provided at the other surface side of the first portion and configured to reinforce the flat cable.

12. The flat cable according to claim 9, wherein the first recessed portion is formed in a reinforcement spacer provided at the other surface side of the first portion and configured to reinforce the flat cable.

13. The flat cable according to claim 11, wherein a surface of the reinforcement spacer is inclined in such a manner that a thickness of the reinforcement spacer is thinner farther from the end.

14. The flat cable according to claim 12, wherein a surface of the reinforcement spacer is inclined in such a manner that a thickness of the reinforcement spacer is thinner farther from the end.

* * * * *